United States Patent [19]
Johnson et al.

[11] Patent Number: 5,174,156
[45] Date of Patent: Dec. 29, 1992

[54] PRESSURE TRANSDUCER WITH REDUCED OFFSET SIGNAL

[75] Inventors: Ralph H. Johnson, Plano, Tex.; Ernest F. Brose, II, Freeport, Ill.

[73] Assignee: Honeywell Inc., Minneapolis, Minn.

[21] Appl. No.: 559,229

[22] Filed: Jul. 27, 1990

[51] Int. Cl.⁵ .............................................. G01L 7/08
[52] U.S. Cl. ...................................... 73/715; 73/721; 73/727; 73/756; 338/4
[58] Field of Search ................. 73/727, 721, 720, 726, 73/715, DIG. 4, 756; 338/4

[56] References Cited

U.S. PATENT DOCUMENTS

| | | | |
|---|---|---|---|
| 4,502,335 | 3/1985 | Wamstad et al. | 73/727 |
| 4,530,244 | 7/1985 | Starr | 73/727 |
| 4,790,192 | 12/1988 | Knecht et al. | 73/721 |
| 5,001,934 | 3/1991 | Tuckey | 73/727 |
| 5,029,479 | 7/1991 | Bryan | 73/720 |

FOREIGN PATENT DOCUMENTS 0119031  9/1980  Japan ..................................... 73/727

*Primary Examiner*—Donald O. Woodiel
*Attorney, Agent, or Firm*—Robert B. Leonard

[57] ABSTRACT

A structure and method of making a piezoresistive transducer with reduced offset current. The transducer is comprised of a piezoresistive die having a support rim and a diaphragm, and a support housing having a wall and an aperture. The shape of the diaphragm is matched with the shape of the aperture while the shape of the support rim is matched with the shape of the wall. By matching these shapes, temperature induced stresses are reduced, thus reducing temperature induced offset currents.

16 Claims, 2 Drawing Sheets

PRESSURE TRANSDUCER WITH REDUCED OFFSET SIGNAL

BACKGROUND OF THE INVENTION

This invention relates to the field of silicon pressure transducers. More specifically, the invention is a method and a device for overcoming packaging and temperature induced offsets in silicon pressure transducers. To make a useful silicon pressure transducer, a silicon die, comprised of a support rim and a diaphragm, was rigidly or semi-rigidly attached to a support housing. This support housing was usually a tube which was used to guide a fluid into contact with the diaphragm. A problem was created, however, in that the structure or tube transmitted stress to the die not related to the pressure applied at the diaphragm. A variable false pressure signal was thus created, the variation occurring with the change in temperature.

A related problem was a transient signal generated by the transducer as the transducer and supporting structure heated up. The supporting structure deformed upon heating. Once again, because the support structure and the transducer were bonded together, stress was transferred to the transducer producing a temperature varying component to the offset signal. This temperature varying component, only stabilized when the temperature of the supporting structure reached a stable level.

Thus, it is an object of the present invention to create a pressure transducer which is more immune to changes in temperature. It is a further object of the present invention to reduce the amount of offset signal generated due to the supporting structure.

SUMMARY OF THE INVENTION

The present invention is a method and device directed toward a pressure transducer comprised of a silicon die and a tube wherein the shape of the tube is matched to the shape of the silicon die. The silicon die is comprised of a diaphragm and a support rim surrounding the diaphragm. The tube has an inside shape which is the same as the diaphragm, while having an outside shape which is the same as the shape of the silicon die. By forming the pressure transducer in such a way, the stresses in the die are reduced thus reducing offset signal.

DETAILED DESCRIPTION OF THE DRAWINGS

Figure 1:
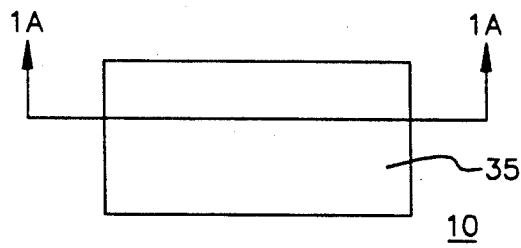
FIG. 1 is a top view of the silicon die of the present pressure transducer

Referring now to FIG. 1. thereshown is a silicon die 10 as used in the present invention. The silicon die 10 may have any external shape, but is hereshown as having a square shape. Further details of the silicon die 10 may be seen by referring to FIG. 1A which is a side view of the silicon die taken along line 1A—1A.

Figure 1A:
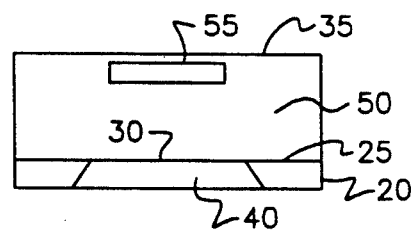
FIG. 1A is a side view of the silicon die depicted in FIG. 1 taken along line 1A—1A.

In FIG. 1A, the silicon die 10 is shown as comprising a substrate 20 and a first layer 50, formed on a first major surface 25 of substrate 20. A portion of substrate 20 has been etched away to define a support rim 40 and a diaphragm 30 having a second major surface 35. The etching of the diaphragm may be done by any of many well known methods. Lastly, piezoresistor 55 is formed in the diaphragm by a, method, for example, ion implantation or diffusion.

Figure 2A:
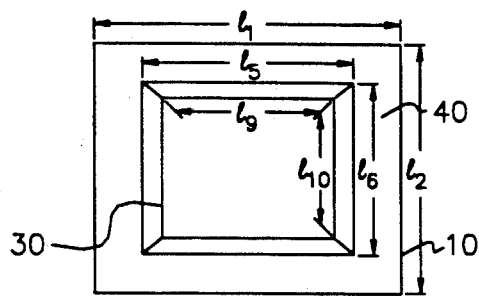
FIG. 2A is a bottom view of the die of FIG. 1.
Figure 2B:
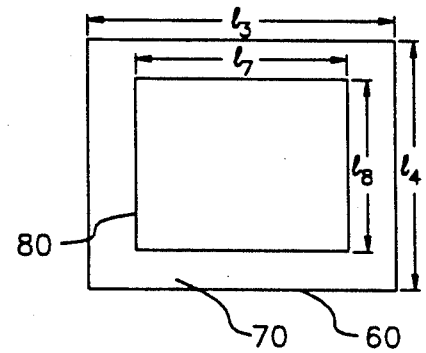
FIG. 2B is a bottom view of a tube.

Referring now to FIGS. 2A and 2B, thereshown is a silicon die 10 and a tube 60 respectively. Tube 60 is comprised of wall portion 70 and aperture 80. In order to make the pressure transducer of the present invention, aperture 80 must have the same shape, here a rectangle, and cross sectional area as diaphragm 30. Or in other words sides $L_5$, $L_6$, $L_7$, $L_8$, $L_9$ and $L_{10}$ have at least the following relationship: $L_5 \geq L_7 \geq L_9$, and $L_6 \geq L_8 \geq L_{10}$, and $L_5 X L_6 \geq L_7 X L_8 \geq L_9 X L_{10}$. Further, the shape and area of the walls 70 of the tube are substantially the same as the shape and area of the support rim 40 or $L_1$ through $L_{10}$ bear at least the following relation: $L_1 \cong L_3$, $L_2 \cong L_4$.

Figure 3:
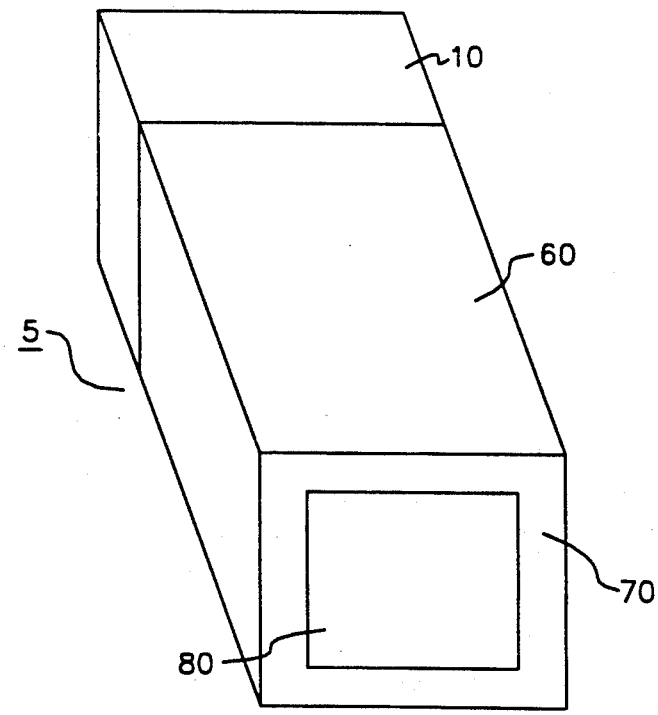
FIG. 3 is a perspective view of a silicon die and tube joined to form a pressure transducer of the present invention.

By joining together a diaphragm and a tube which meet the above description, the pressure transducer 5 of FIG. 3 is thus created. The pressure transducer 5 is comprised of the silicon die 10 and tube 60 having wall portion 70 and aperture 80. By matching the size and shape of the aperture 80 to the diaphragm and the wall size and shape to that of the supporting rim, stress in the x and y directions are equalized. The resistance $P = P_o + \Delta P$ where $P_o$ = a nominal resistance, $\Delta P$ is the change to resistance due to stress. Because of the alignment of the resistors in the silicon die this equation can be rewritten $\Delta P \cong Po(\pi_{11}\tau x + \pi_{12}\tau y)$ where $\pi_{11}\tau_x$ and $\pi_{12}\tau_y$ are the changes in resistivity in the x and y directions due to stress and $\tau x$ and $\tau y$ are the stresses, in the x and y direction respectively. $\pi_{11}$ and $\pi_{12}$ are nearly equal and opposite resulting in $\Delta P \cong Po \pi_{11}(\tau x - \tau y)$. Thus the change in resistivity due to stress can be minimized where the stress in the x direction is equal to the stress in the y direction.

Where the support structure (tube) closely matches the silicon die in size and shape, the stresses on the die are equalized. Thus, by closely matching the tube to the silicon die, stress related offsets are reduced. Also as a result of the silicon die-tube matching, temperature transient offsets are also reduced.

Figure 4A:
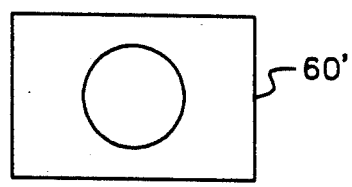
FIGS. 4A, 4B and 4C show examples of other possible configurations for the tube.
Figure 4B:
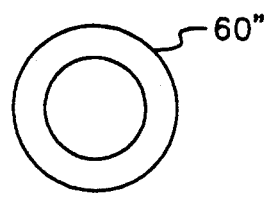
Figure 4C:
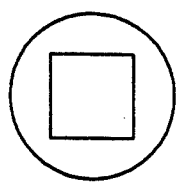

Turning now to FIGS. 4A, 4B and 4C, thereshown are other possible tube inside and outside shapes. FIG. 4A depicts a tube 60' having a rectangular external shape and a circular aperture. FIG. 4A shows a tube 60" having a circular external shape and a circular aperture. FIG. 4C shows a tube 60''' having a circular external shape and a square aperture. All three of these tubes are intended for use with a die having the same external shape as the external shape of the tube, and a diaphragm having the same shape as the aperture in the tube.

Figure 5A:
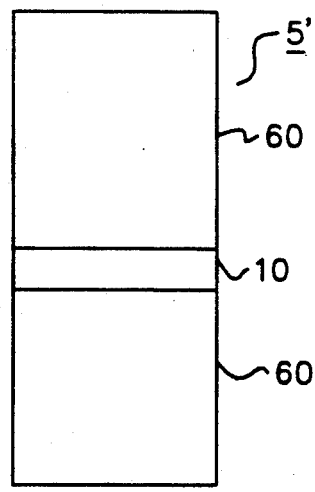
FIG. 5A shows a pressure transducer which can be used to measure differential pressure.
Figure 5B:
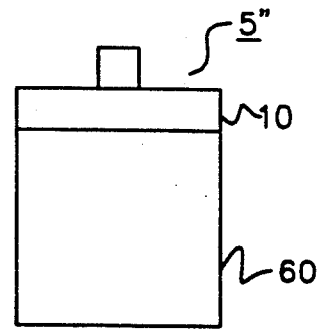
FIG. 5B shows a pressure transducer which can be used to measure absolute pressure.

Referring now to FIG. 5A, thereshown is a pressure transducer 5, comprised of a silicon die and two tubes 60. The tube 60 should be identical in size and shape. This pressure transducer 5' can be used to measure the pressure difference between two isolated regions. The pressure transducer 5" shown in FIG. 5B includes the silicon die 10, a tube 60 and a cap 90. Cap 90 is sized and shaped to cover the diaphragm on the silicon die 5 side away from the tube. By evacuating the volume covered by cap 90, the pressure transducer can be used to measure absolute pressure.

The foregoing has been a description of the applicant's novel and nonobvious pressure transducer. The applicant does not intend to be limited by the foregoing description, but claims the extent of his property in the claims appended hereto.

I claim:

1. A pressure transducer, comprising:
   a die comprising a support rim and a diaphragm, said support rim being formed to have a first shape and cross sectional area, said diaphragm being formed to have a second shape and area in a major surface;
   a first tube having a wall and an aperture therethrough, said tube being in physical contact with said die and being adaptive to allow a fluid to contact said diaphragm, said tube being formed so that said aperture has generally the same shape and cross sectional area as said second shape and area, and said wall structure has a shape and cross sectional area generally the same as said first shape and cross sectional area;
   a second tube joined to said die at said major surface of said diaphragm, said second tube being generally identical to said first tube; and
   means for joining said first and second tubes with said die.

2. The pressure transducer of claim 1 wherein said diaphragm is comprised of N-type silicon material having P-type diffusions therein, said P-type diffusions being piezoresistive sensing elements.

3. The pressure transducer of claim 2 wherein said first shape is a square and said second shape is a square.

4. The pressure transducer of claim 2 wherein said first shape is a circle and said second shape is a square.

5. The pressure transducer of claim 2 wherein said first shape is a circle and said second shape is a circle.

6. The pressure transducer of claim 2 wherein said first shape is a circle and said second shape is a circle.

7. Pressure transducer of claim 1, further comprising:
   a second tube identical to said first tube in contact with said die at said second major surface of said diaphragm; and
   means for joining said second tube with said die.

8. The transducer of claim 1, wherein:
   said first and second shapes are rectangles.

9. The pressure transducer, comprising:
   a die comprising a support rim and a diaphragm, said support rim being formed to have a first rectangular shape and cross sectional area, said diaphragm being formed to have a second rectangular shape and area in a major surface;
   a first tube having a wall and an aperture therethrough, said tube being in physical contact with said die and being adapted to allow a fluid to contact said diaphragm, said tube being formed so that said aperture has the generally same rectangular shape and cross sectional area as said second rectangular shape and area, and said wall structure has a rectangular shape and cross sectional area generally the same as said first rectangular shape and cross sectional area;
   a gas tight cap in physical contact with said major surface to create an evacuated chamber over said diaphragm thus enabling the pressure transducer to measure absolute pressures; and
   means for joining said tube and said cap with said die.

10. The pressure transducer of claim 9 wherein said diaphragm is comprised of said N-type silicon material having P-type diffusions therein, said P-type diffusions being piezoresistive sensing elements.

11. The pressure transducer of claim 10 wherein said first shape is a square and said second shape is a square.

12. The pressure transducer of claim 10 wherein said first shape is a circle and said second shape is a square.

13. A pressure transducer, comprising:
    a die having a support rim and a diaphragm attached thereto, said support rim being defined by a first rectangular shape, said diaphragm being defined by a second rectangular shape and area;
    a first tube having a wall and an aperture therethrough, said tube being attached to said die with said aperture being aligned with said diaphragm and said wall being aligned with said support rim, said aperture having generally the same rectangular shape and cross sectional area as said second rectangular shape and area, said wall having the same rectangular shape as said first rectangular shape and an inner perimeter generally the same as an inner perimeter of said support rim.

14. The transducer of claim 13, wherein:
    said second shape is a square.

15. The transducer of claim 13, further comprising:
    a second tube attached to an opposite side of said die than said first tube, said first and second tubes being generally identical in cross sectional area and shape.

16. The transducer of claim 13, further comprising:
    a gas tight cap bonded to a major surface of said diaphragm at an opposite side of said die than said first tube.

* * * * *